United States Patent
Kumar (10) Patent No.: US 9,987,789 B2
(45) Date of Patent: Jun. 5, 2018

(54) LIQUID JET DIAMETER CONTROL

(71) Applicant: DISCMA AG, Zürich (CH)

(72) Inventor: Pankaj Kumar, Dexter, MI (US)

(73) Assignee: DISCMA AG, Zürich (CH)

(*) Notice: Subject to any disclaimer, the term of this patent is extended or adjusted under 35 U.S.C. 154(b) by 190 days.

(21) Appl. No.: 14/900,722

(22) PCT Filed: Jun. 28, 2013

(86) PCT No.: PCT/US2013/048450
§ 371 (c)(1),
(2) Date: Dec. 22, 2015

(87) PCT Pub. No.: WO2014/209339
PCT Pub. Date: Dec. 31, 2014

(65) Prior Publication Data
US 2016/0136866 A1    May 19, 2016

(51) Int. Cl.
*B29C 49/16* (2006.01)
*B29C 49/46* (2006.01)
(Continued)

(52) U.S. Cl.
CPC .............. *B29C 49/46* (2013.01); *B29C 49/12* (2013.01); *B29C 49/14* (2013.01); *B29C 49/16* (2013.01);
(Continued)

(58) Field of Classification Search
CPC .............. B29C 49/46; B29C 2049/465; B29C 2049/4652; B29C 2049/4664;
(Continued)

(56) References Cited

U.S. PATENT DOCUMENTS 5,888,598 A * 3/1999 Brewster ............. B29C 49/0005
264/513
8,486,325 B2 * 7/2013 Siegl ....................... B29B 11/08
264/523
(Continued)

FOREIGN PATENT DOCUMENTS

EP          1293328 A1 * 3/2003  ......... B29C 49/0073
JP          62164504 A  * 7/1987
(Continued)

*Primary Examiner* — Robert B Davis
(74) *Attorney, Agent, or Firm* — Eric J. Sosenko; Jonathan P. O'Brien; Honigman Miller Schwartz and Cohn LLP (57) ABSTRACT

A system and method for hydraulic blow molding a plastic preform into a container. The system includes a nozzle having a nozzle body with a main bore extending therethrough and an outlet for ejecting molding medium into a preform positioned within a mold. A minimum internal diameter is defined within the body of the preform, which is bound on opposing ends between an open end and a closed end. To form the container, a liquid stream is injected into the preform. The liquid stream is defined by the outlet so as to have an external diameter that is less than the minimum inner diameter of the preform, allowing the stream to impinge upon the close end of the preform without impinging upon a transition of the preform, where the minimum inner diameter of the preform is reduced from the diameter of the finish.

20 Claims, 8 Drawing Sheets

(51) Int. Cl.

| | | |
|---|---|---|
| *B29C 49/14* | (2006.01) | |
| *B29C 49/12* | (2006.01) | |
| *B29L 31/00* | (2006.01) | |
| *B29C 49/06* | (2006.01) | |
| *B29C 49/42* | (2006.01) | |
| *B29C 49/58* | (2006.01) | |
| *B29C 49/78* | (2006.01) | |
| *B29K 67/00* | (2006.01) | |
| *B29K 105/00* | (2006.01) | |

(52) U.S. Cl.
CPC ......... *B29B 2911/14366* (2013.01); *B29B 2911/14426* (2013.01); *B29C 49/06* (2013.01); *B29C 49/4289* (2013.01); *B29C 49/78* (2013.01); *B29C 2049/1219* (2013.01); *B29C 2049/465* (2013.01); *B29C 2049/4652* (2013.01); *B29C 2049/4664* (2013.01); *B29C 2049/5803* (2013.01); *B29K 2067/003* (2013.01); *B29K 2105/253* (2013.01); *B29L 2031/712* (2013.01); *B29L 2031/716* (2013.01)

(58) Field of Classification Search
CPC ........... B29C 49/58; B29C 2049/5803; B29C 49/4289; B29C 49/16; B29B 2911/1436; B29B 2911/14426; B29B 2911/1448
See application file for complete search history.

(56) References Cited

U.S. PATENT DOCUMENTS

| | | | |
|---|---|---|---|
| 8,765,038 B2 * | 7/2014 | Hirota | ............... B29B 11/12 264/151 |
| 2008/0257855 A1 * | 10/2008 | Patel | ............... B29B 11/14 215/370 |
| 2011/0135778 A1 | 6/2011 | Andison et al. | |
| 2012/0091635 A1 | 4/2012 | Eberle | |
| 2013/0106027 A1 | 5/2013 | Maki et al. | |
| 2013/0122136 A1 | 5/2013 | Fevre et al. | |
| 2013/0307197 A1 | 11/2013 | Haesendonckx et al. | |

FOREIGN PATENT DOCUMENTS

| | | |
|---|---|---|
| JP | 2002067131 A | 3/2002 |
| WO | 9950047 A1 | 10/1999 |

\* cited by examiner

LIQUID JET DIAMETER CONTROL

BACKGROUND

1. Field of the Invention

The present invention generally relates to molding of plastic containers from preforms. More particularly, the invention relates to the control of the liquid stream that is injected into the preform during hydraulic blow molding.

2. Description of Related Art

Plastic containers are commonly used for the packaging of various products, including liquid (including viscous) products. One common type of plastic container is the blow molded plastic container, which is often formed of a polyester material, and more specifically, polyethylene terephthalate (PET). Blow molded plastic containers are typically formed by placing a heated preform into a blow mold and then blowing and inflating the preform with air until the preform contacts the interior surfaces of the mold cavity, which define the final shape of the desired container. Once the inflated preform has been held against the interior surfaces of the mold cavity by the pressure of the blow air for a length of time sufficient to "freeze" the plastic, the blow molded container is removed from the mold.

In traditional blow molding, after the heated preform has been introduced into the mold cavity, a stretch rod is often advanced within the preform to initiate longitudinal stretching of the preform before any significant radial expansion of the preform is undertaken by the introduction of blow air. The stretch rod will typically remain within the preform during radial expansion, and is retracted prior to removal of the container from the molding machine.

The blow molded containers are then transported to the location where the containers will be filled with the intended product. This may include the packaging and shipping of the containers to a remote location or may involve the transfer of the containers to a local facility, where these final steps occur before being shipped to a retailer or end-user.

With the above method, blow molding and filling are distinct and separate steps in the process of producing a product filled container. A newer process involves the use of the end product in the molding of the container. Instead of utilizing air as a blowing medium, this new process utilizes a liquid, and more specifically the actual end product being packaged in the container and sold to the end consumer, as the container's molding medium. As used herein, this type of molding is referred to as hydraulic blow molding.

SUMMARY

In satisfying the above need, as well as overcoming the enumerated drawbacks and other limitations of the related art, in one aspect the present invention provides a method and system for hydraulic blow molding a container from a preform.

In another aspect, the invention provides a method of forming a container from a preform made of plastic, the method comprising the steps of positioning a preform within a mold having interior surfaces defining a cavity in the shape of the container, the preform having a body bounded by a closed end and an open end, the body defining a preform minimum diameter, injecting a molding medium into the preform axially stretching the preform within the mold, radially expanding the preform into conformity with the interior surfaces of the cavity defining the shape of the container, radial expansion being effectuated by the injected molding medium; the method further characterized by the injecting step further including the steps of forming the molding medium into a stream having an outer diameter that is less than the minimum diameter of the preform, and directing the stream into the preform to initially impinge upon the preform at the closed end and to initially avoid impingement upon the preform in areas of the preform other than the closed end In a further aspect of the invention, the preform includes a transition extending between a finish and a body of the preform, the finish reducing in diameter from the finish to the body of the preform, the step of injecting the molding medium further including the step of forming the stream and injecting the stream such that the stream does not impinge upon the transition.

In an additional aspect, the invention provides that the step of injecting the molding medium further including the step of forming the stream and injecting the stream such that the stream does not impinge upon the body of the preform.

In yet another aspect of the invention, the invention provide for the step of axially stretching the preform to include moving a stretch rod to an extended position where the stretch rod is extended within and contacts the preform.

In still another aspect of the invention, the step of injecting liquid occurs while the stretch rod is extended within the preform.

In a further aspect of the invention, the step of injecting liquid occurs after the step of axially stretching the preform.

In an additional aspect of the invention, the step of axially stretching the preform includes axially stretching the preform as a result of a force exerted on the preform by the molding medium being injected into the preform.

In another aspect of the invention, the step of injecting the molding medium includes the step of forming the steam with a diameter of at least 2 mm less than the minimum diameter of the body of the preform.

In still a further aspect, the invention includes the steps of extending a centering rod into the cavity, engaging an exterior surface of the closed end of the preform with the centering rod, and retracting the centering rod during axial stretching of the preform.

In another aspect, the invention provides a molding system for hydraulic blow molding a preform made of plastic into a container, where the molding system comprising a mold having interior surfaces defining a mold cavity in the shape of the container, the mold being configured to receive a preform therein, the preform having a body extending between a closed end and an open end, the body defining a minimum inner diameter of the preform, a nozzle having a main bore extending therethrough, the nozzle body including an inlet into the main bore and an outlet from the main bore, the outlet defining an outlet diameter, a seal pin moveable with respect to the nozzle between a closed position and the open position, in the closed position the seal pin closing off the outlet from the main bore and in the open position the seal pin not closing off the outlet, a source of molding medium, wherein the molding medium is a liquid that is to be retained in the container, the source being the coupled to the nozzle, and the outlet diameter being less than the minimum internal diameter of the preform whereby during molding the molding medium is injected as a stream into the preform from the outlet such that the stream does not impinge the body of the preform.

In yet another aspect of the invention, the body of the preform includes a transition extending from the open end toward the closed end, the transition reducing in diameter as it progress from the finish toward the closed end.

In a further aspect of the invention, the outlet diameter is at least 2 mm less than the minimum inner diameter of the preform.

In an additional aspect, the invention includes a stretch rod, the stretch rod being located in a central bore of the seal pin and being moveable between a retracted position and an extended position, in the extended position the stretch rod extending into the preform.

In still another aspect of the invention, the stretch rod extends centrally through the outlet.

In further aspect, the invention includes a centering rod, the centering rod being moveable between a retracted position and an extended position, in the extended position the centering rod contacting the closed end of the preform on an exterior surface thereof.

In another aspect, the invention includes a centering rod, the centering rod being moveable between a retracted position and an extended position, in the extended position the centering rod contacting the closed end of the preform on an exterior surface thereof and during axial stretching of the preform.

In a yet a further aspect of the invention, the outlet includes a terminal portion defining a spray angle.

In an additional aspect, the spray angle is defined relative to a central longitudinal axis extending through the outlet and is in the range of 0° to 5°.

In still another aspect of the invention, the spray angle is defined relative to a central longitudinal axis extending through the outlet and is about 0°.

In another aspect of the invention, the minimum inner diameter of the preform is defined by a transition of the preform.

Further objects, features and advantages of this invention will become readily apparent to persons skilled in the art after a review of the following description, with reference to the drawings and claims that are appended to and form a part of this specification.

DETAILED DESCRIPTION

As mentioned above, in hydraulic blow molding, instead of air, the molding medium is a liquid. As used herein, the term liquid is intended to include not only those liquids with a viscosity near water (e.g. liquids consumed as beverages, including water, sports drinks, tea, etc.), but also those liquids with a viscosity substantially greater than water and generally referred to as viscous liquids (e.g. viscous liquids used as condiments or household products, including ketchup, dishwashing liquid, etc.).

A traditional stretch rod may be used in hydraulic blow molding, molding where the liquid end product is used as the molding medium. In such instances, the stretch rod can be a potential a source of product contamination and, resultantly, may require the incorporation of a clean-in-place system/process in order to ensure that product contamination does not occur.

The present invention has applicability to hydraulic blow molding that is performed either with or without a stretch rod. According to one aspect of the present invention, the traditional stretch rod is used, and, according to another aspect of the invention, the stretch rod is eliminated in favor of what is herein referred to as a liquid vector. By employing the liquid vector, initial or complete axial stretching of the preform can be performed utilizing the end product that is intended to be retained in the newly formed container.

Figure 1A:
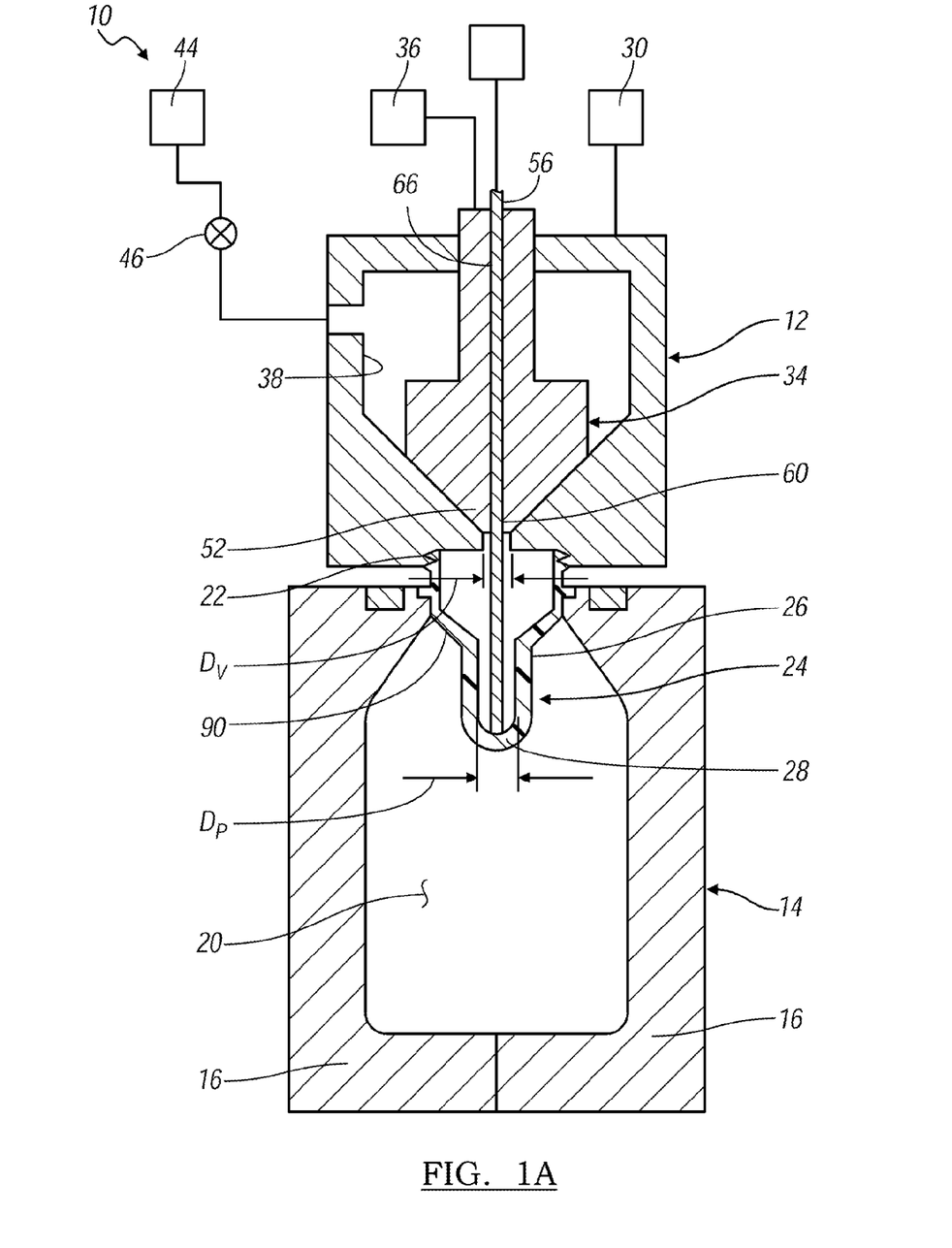
FIGS. 1A and 1B are schematic illustrations of a hydraulic blow molding system incorporating the principles of the present invention.
Figure 1B:
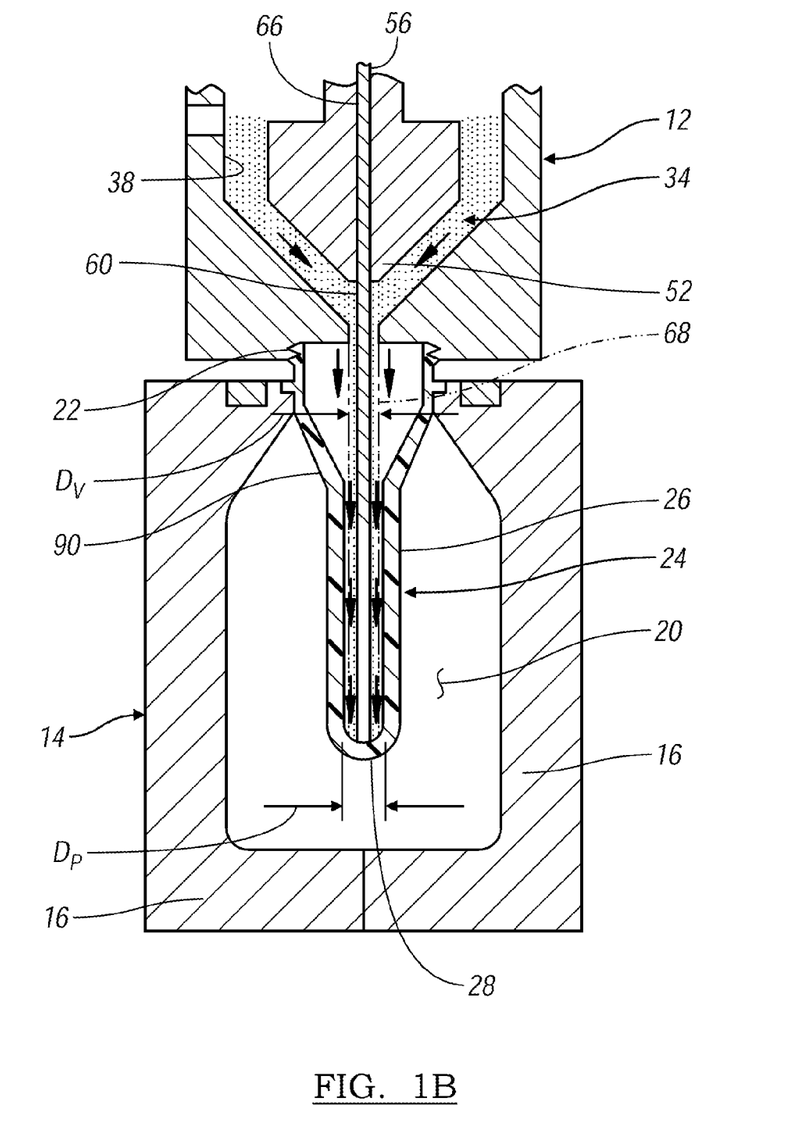

Referring now to the drawings, a hydraulic blow molding system is schematically illustrated in FIGS. 1A and 1B and generally designated at 10. The molding system 10 includes as its primary components a nozzle 12 and at least one mold 14, only one of which is shown in the drawings.

The mold 14 is generally formed by a pair of mold halves 16, each having interior surfaces 18 that cooperate to define a mold cavity 20 in the shape of the desired container. The mold halves 16 are hinged or otherwise connected to one another enabling them to be opened and closed, thereby allowing the mold halves 16 to receive a preform 24 and position the body 26 of the preform 24 within the mold cavity 20.

The upper portion of the mold 14 is configured to receive and retain the preform 24. One means by which the preform 24 may be retained is by receiving the support or handling ring of the preform 24 within a correspondingly shaped recess in the top of the mold 14, with the threaded finish 22 of the preform 24 extending and being located above the mold 14. Various other alternate methods may also be employed to retain and engage the preform 24 with the mold 14, such as enclosing or capturing the support ring within a corresponding portion of the mold 14.

Prior to placing the preform 24 within the mold cavity 20, the body 26 of the preform 24 is heated to a temperature that is suitable for forming and filling the container. The preform 24 may be heated by various means, including passing of the preform 24 through an oven (not shown) past a bank of radiant, infrared or other type of heaters. Depending on the specifics of the preform and container design, the oven may be configured to induce a varied temperature profile along the longitudinal length of body 26, from the finish 22 down to a closed-end 28 of the preform 24.

The preform 24 may also be formed from a variety of materials. While polyethylene terephthalate (PET) is a preferred material, other materials from which the container may be formed include, without limitation, polyethylene, polypropylene, polyethylene naphthalate (PEN), thermoplastic blends and multilayer constructions of such materials. The present invention is not intended to be restricted to any particular material.

With the heated preform 24 positioned within the mold 14, the body 26 of the preform 24 extends into the free space of the mold's cavity 20, as seen in FIG. 1A. Thereafter, the nozzle 12 is moved by an actuator 30, which may be a motor driven, pneumatically driven, or otherwise driven actuator, to a position where the nozzle 12 sealingly engages the top or sealing surface of the preform's finish 22.

The nozzle 12 has two main components, namely a nozzle body 32 and a seal pin 34, with the seal pin 34 being located within a bore 38 of the nozzle body 32. Hereafter, this bore 38 is referred to as the main bore 38. The seal pin 34 is axially translatable within the main bore 38 between closed and open positions, which are further discussed below, by a second actuator 36. Like the first actuator 30, the second actuator 36 may one of the known varieties of actuators. Alternatively, a single actuator may be employed to effectuate and control movement of both the nozzle body 32 and the seal pin 34. The nozzle body 32 further has an inlet 40 for introducing a molding medium into the main bore 38 and has an outlet 42 for ejecting the molding medium therefrom.

Coupled to the main bore 38, by way of the inlet 40, is a source 44 of the molding medium 45. The molding medium 45, when received by the main bore 38, is in a pressurized state. Pressurization may occur or exist at the source 44 or it may be developed en route to the nozzle 12. Pressurization can be achieved by a variety of means associated with the nozzle 12, including use of a high pressure pump or a fill chamber and piston. For the purposes of the figures, the designation of the source 44 is intended to represent both the source of the molding medium 45 and its pressurization means. To control the providing of the molding medium 45 into the main bore 38, an inlet valve 46 (shown in FIG. 1A, but omitted in FIG. 1B) may optionally be provided. Depending on the specific design of the system, the inlet valve 46 may be located between an unpressurized source of the molding medium 45 and the pressurization means.

Immediately adjacent to the outlet 42, the main bore 38 is provided with an interior surface that defines a valve seat 48. While preferably provided in a frustoconical shape, this surface may have other shapes so long as those shapes are capable of operating as a valve seat when engaged with a corresponding sealing surface 50 of the seal pin 34. In the nozzle 12 of the illustrated embodiment, the seal pin's sealing surface 50 is defined by an exterior surface that has a corresponding frustoconical shape. In its lowermost or extended position, which is generally represented in FIG. 1A, the seal pin 34 is located such that the sealing surface 50 sealingly engages the valve seat 48 of the main bore 38 and a distal end 52 of the seal pin 34 extends into the outlet 42.

During initial operation of the nozzle 12, the seal pin 34 is extended by the actuator 36 such that the sealing surfaces 50 engages the valve seat 48, thereby sealing off the main bore 38 from the interior of the preform 24, and the molding medium 45 is provided into the main bore 38 through the inlet 40. The nature of the engagement between the sealing surface 50 and the valve seat 48 is such that no molding medium 45 flows from the main bore 38 through the outlet 42.

Disposed within a central bore 54 of the seal pin 34 is a stretch rod 56. The stretch rod 56 is cylindrical in shape and includes a distal end 58 that is shaped to engage the internal surface of the closed end 28 of the preform 24. The stretch rod 56 is axially slideable within the central bore 54 from a retracted position to an extended position. In the retracted position, the distal end 58 of the stretch rod 56 is withdrawn into or adjacent to the distal end 52 of the seal pin 34. In the extended position, the distal end 58 of the stretch rod 56 engages the closed end 28 of the preform 24. To advance and retract the stretch rod 56, the stretch rod 56 is coupled to an actuator 60, and may include a piston and be driven by mechanical, pneumatic, hydraulic, servo or other means.

With the sealing surfaces 50 engaged with the valve seat 48, the stretch rod 56 is extended to initially engage the closed end 28 of the preform 24, as seen in FIG. 1A. Thereafter, the stretch rod 56 is further advanced by the actuator 60 to axially stretch the preform 24, as indicated in phantom in FIG. 1A. The amount of axial stretch induced into the preform 24 may be a partial or full axial stretching of the preform 24. In the FIGS. 1A and 1B, the preform 24 is shown partially axially stretched, it being understood that the stretch rod 56 could be advanced such that the closed end 28 of the preform 24 engages the bottom wall of the interior surfaces 18 defining the mold cavity 20, thereby fully axially stretching the preform 24. The extent of stretching performed during this stage of operation is dependent upon the specific design of the preform 24, the container and other processing factors.

Once the preform 24 has been sufficiently axially stretched, the stretch rod 56 may be retracted into the central bore 54 of the seal pin 34. Alternatively, and as seen in FIG. 1B, the stretch rod 56 may remain in its extended position. At this time, the seal pin 34 is also retracted, separating the sealing surfaces 50 from the valve seat 48, which is seen in FIG. 1B. With the sealing surfaces 50 withdrawn from the valve seat 48, the main bore 38 of the nozzle body 32 is brought into fluid communication with the interior of the preform 24 and the pressurized molding medium 45 is ejected from the outlet 42 and injected into the preform 24.

Ejection of the molding medium 45 from the exit orifice 42 is done so as to define a jet or stream of liquid, hereafter stream 62, within the preform 24 and about the stretch rod 56. The stream 62 is specifically directed to initially impinge upon the closed-end 28 of the preform 24, as seen in FIG. 1B. Thereafter, the resultant flow of the molding medium 45 operates to radially expand the preform 24, and further axially stretch the preform 24 if required, into conformity with the surfaces 18 defining the cavity 20, thereby both forming and filling the container 64 (shown in phantom) with the molding medium 45.

In certain instances, the preform 24 is provided with a transition 66 between the finish 22 and a generally cylindrical portion of the body 26 of the preform 24. The transition 66 progressively reduces in diameter and increases in thickness as it progresses from the finish 22 to the cylindrical portion of the body 26. As a result, the inner diameter of the preform 24 at the end of the transition 66, adjacent to the cylindrical portion of the body 26, is significantly narrower than the inner diameter of the finish 22 adjacent to the nozzle 52. Additionally, as the preform 24 is stretched by the stretch rod 56, the inner diameter of the preform 24 further narrows toward the closed end 28.

If the temperature of the stream 62 initially injected into the preform 24 is less than the glass transition temperature of the preform 24, the effect of contact between the stream 62 and the material in the transition 66 may prematurely freeze or cool the material of the transition 66 to a temperature that is not conducive to forming of the container 64. Additionally, as a result of the liquid nature of the molding medium 45 forming the stream 62, heat is more readily conducted from the material of the transition 66 than if the molding medium had been air. Premature freezing/cooling of the transition 66 material resulting from contact with the molding medium 45 can result in inconsistent formation of the resulting container 64 or in the rupturing or blowing out of the preform 24 during forming of the container 64.

To avoid these potential problems, according to one aspect of the invention, the diameter of the outlet 42 (the outlet diameter) of the seal pin's main bore 38 is sized such that it is less than the minimum inner diameter ($D_p$) of the preform 24, which may be at the point where the transition 66 merges with the body 26 of the preform 24 or at another location within the body 26 of the stretched preform 24. For clarity purposes, it is noted that internal radius of the closed end 28 of the preform 24 is not utilized in determining the minimum inner diameter of the preform 24. As a result of this sizing of the exit orifice 60, the outer diameter ($D_s$) of the stream 62 is also less than the smallest inner diameter ($D_p$) of the preform 24. Preferably, the outer diameter ($D_s$) of the stream 62 is at least 2 mm less than the smallest inner diameter of the preform 24. This additional separation of the stream 62 from the inner walls of the preform 24 accommodates turbulence that may be resident in the stream 62, while allowing for the largest diameter stream 62 to engage the closed-end 28 of the preform 24. The stream 62 will initially avoid contact with the transition 66 during the radial expansion of the preform 24. However, due to the large flow rate of the molding medium 45 into the preform 24, the stream 62 will fill the body 26 of the preform 24 causing radial expansion and formation of the container 64.

It will be appreciated that the controlling of the outer diameter ($D_s$) of the stream 62 may be employed with preforms 24 lacking a narrowing transition 66. In those instances, the outer diameter ($D_s$) of the stream 62 is still sized to be less than the inner diameter ($D_p$) of the preform 24 at its smallest dimension.

Additionally, the temperature of the stream 62 must be such that it allows for proper radial expansion and any further required axial stretching. As such, it is preferred that the temperature of the stream 62 is in the range of about 10° C. to 100° C. so as to not cool the preform 24 below its glass transition temperature thereby compromising the ability to effectively and fully form the container 64. In this regard, the molding medium 45 may be heated to a temperature above that of the source 44, before or after entry into the main bore 38. Such heating may be achieved by providing a heating element (not shown) within the nozzle body 32, adjacent to at least a portion of the main bore 34.

Figure 2A:
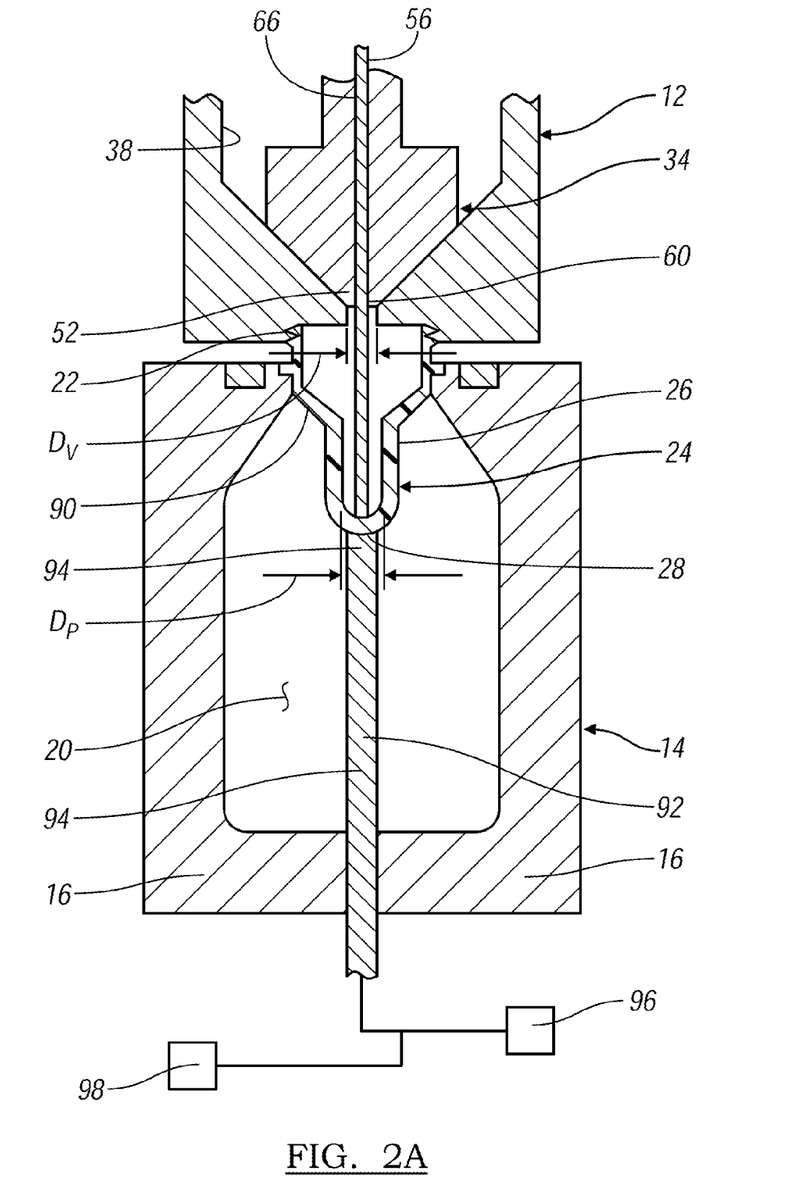
FIGS. 2A and 2B are schematic illustrations of the embodiment seen in FIGS. 1A and 1B and further incorporating the use of a centering rod.
Figure 2B:
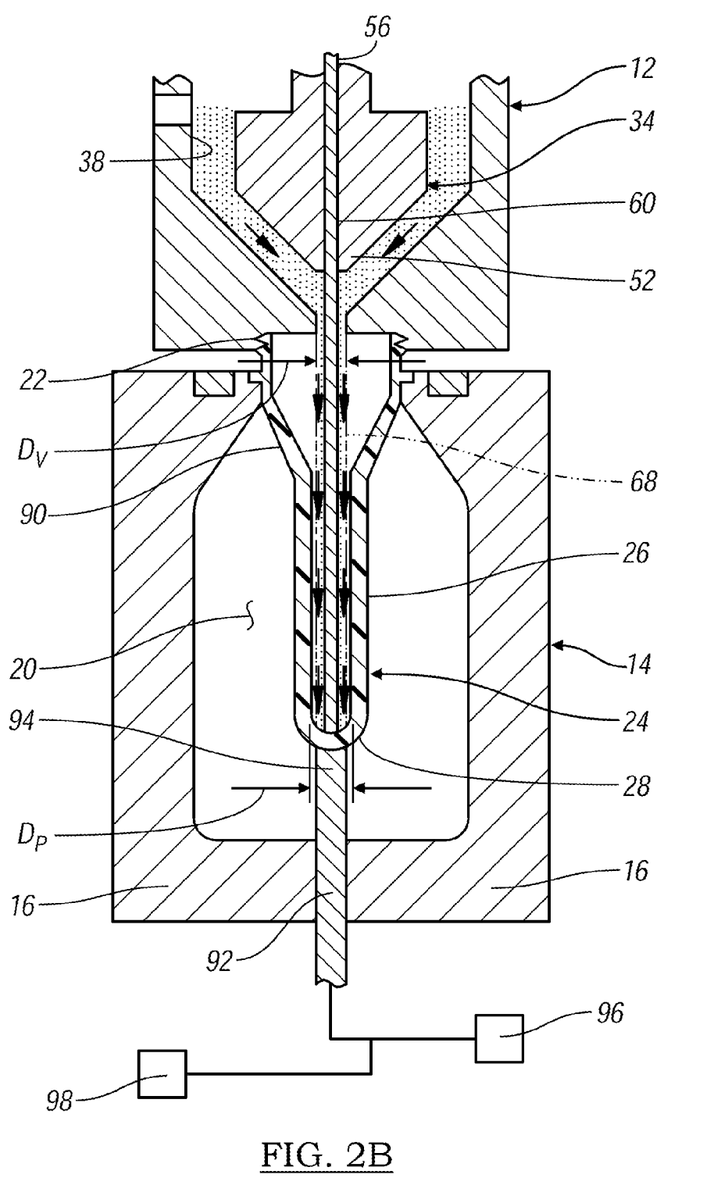

To assist in the stretching of the preform 24 and formation of the container 64, a centering rod 68 may be employed. As illustrated in FIGS. 2A and 2B, a centering rod 68 is provided in connection with a hydraulic blow molding system 10. Other than the inclusion of the centering rod 68, the system 10 shown in FIGS. 2A and 2B is identical to the system 10 seen in FIGS. 1A and 1B. Accordingly, common elements and features are designated with the same reference numerals and a discussion of those common elements and feature is omitted in connection with FIGS. 2A and 2B, the prior discussion being herein incorporated by reference.

As shown in FIGS. 2A and 2B, the centering rod 68 extends through the mold assembly 14, generally between mold halves 16, and is positioned such that a contact tip 70 engages the closed-end 28 of the preform 24. The contact tip 70 may be provided with a shape on its end face that conforms with the shape of the closed-end 28 of the preform 24. In the present instance, the end face of the contact tip 70 is concave or dished-shape. The concave shape of the contact tip 70 may further include a central recess formed therein and designed to receive any vestige of the gate used when initially injection molding the preform 24.

As seen in FIG. 2A, the extended centering rod 68 engages the closed-end 28 of the preform 24 prior to initial stretching of the preform 24 by the stretch rod 56. As the stretch rod 56 is extended, the centering rod 68 is retracted generally at the rate at which the preform 24 is stretched. The retraction of the centering rod 68 may be directly in response to the stretching of the preform 24, i.e. the centering rod 68 may be acted upon and forced to retract as a result of forces exerted by the stretch rod 56 and the stretching preform 24. Alternatively, the retraction of the centering rod 68 may be controlled by the actuator 72 used to initial extend the centering rod 68 into engagement with the preform 24. In this latter instance, controlling the retraction the centering rod 68 may utilize a feedback loop that employ sensors 74 measuring the pressure being exerted on the contact tip 70 or centering rod 68 by the stream 62. Through the use of the feedback loop, the rate of stretching of the preform 24 may be held or controlled at the desired rate, which may be either a constant or variable rate.

Figure 3A:
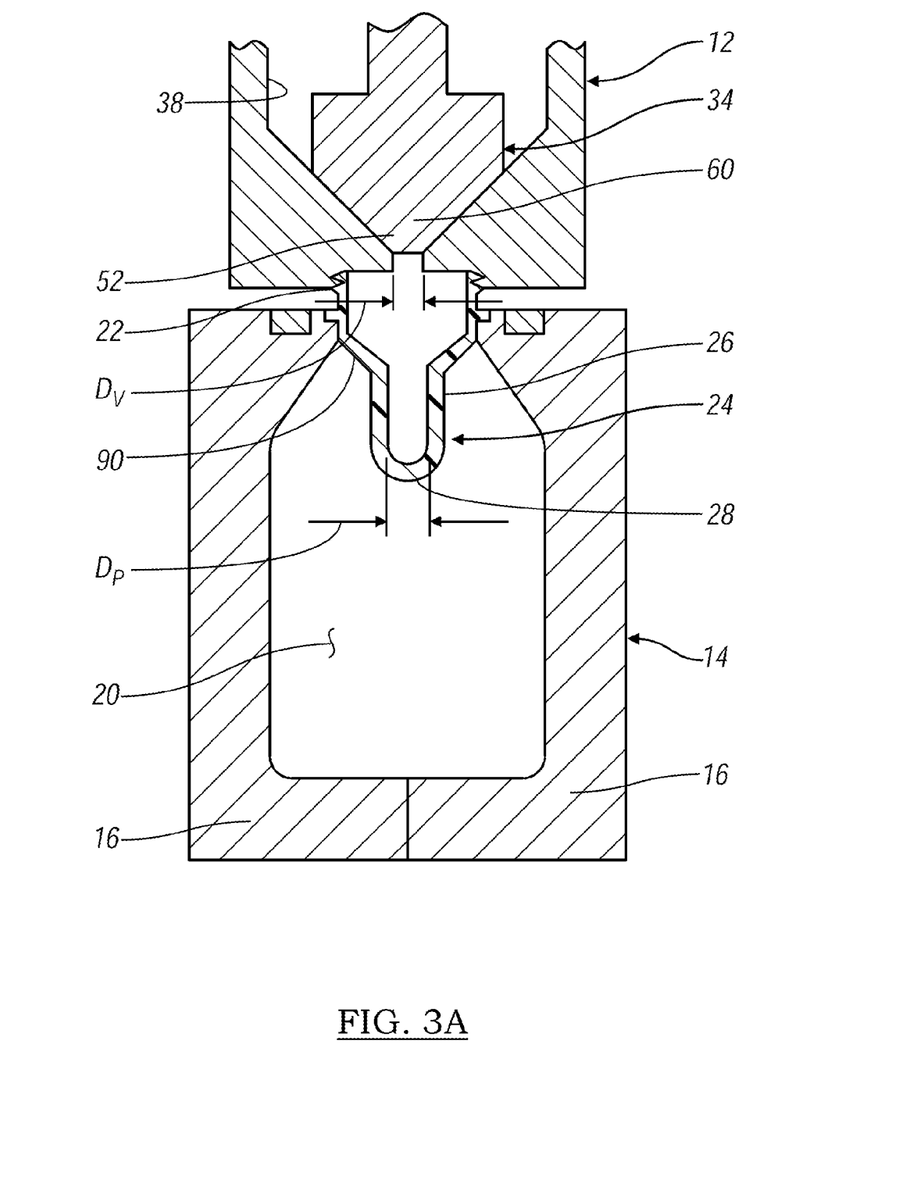
FIGS. 3A and 3B are schematic illustrations of another embodiment of a hydraulic blow molding system incorporating the principles of the present invention.
Figure 3B:
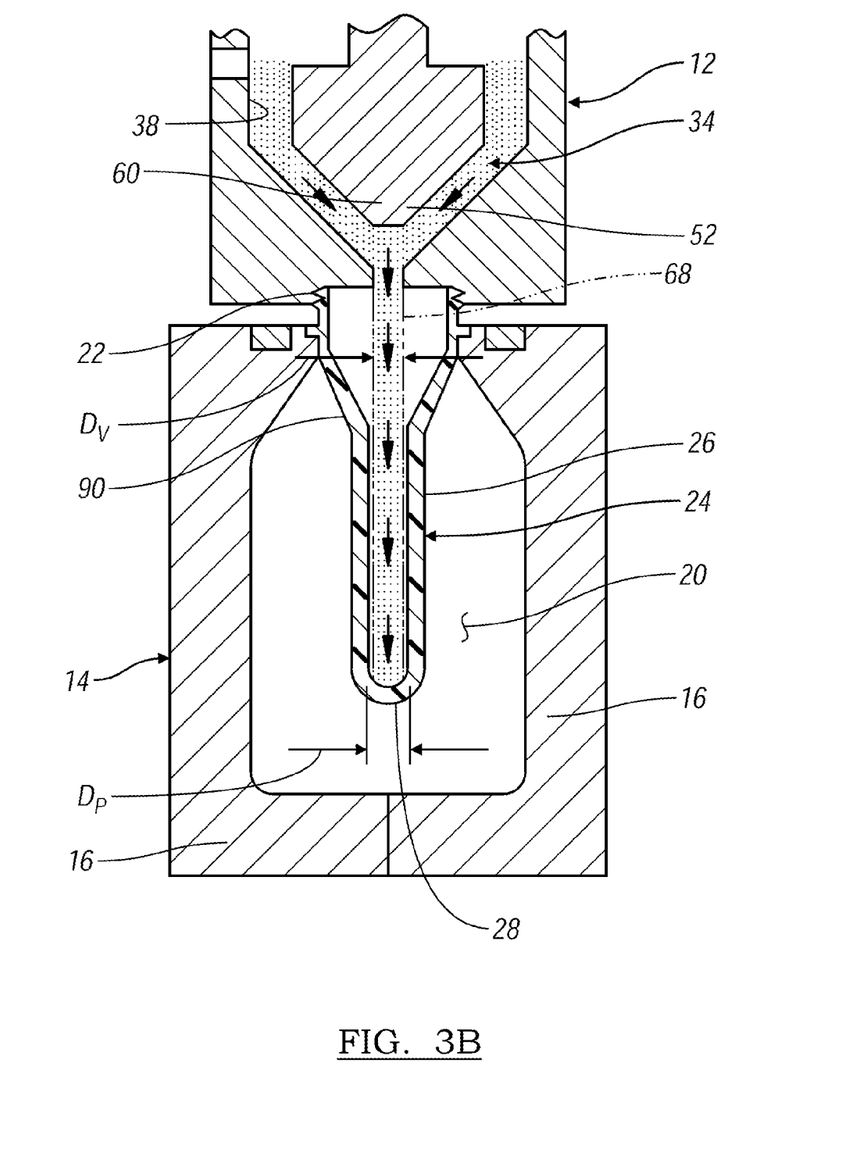

Referring now to FIGS. 3A and 3B, the embodiment of these Figures is similar to FIGS. 1A and 1B, except that no stretch rod 56 is utilized. Other than the exclusion of the stretch rod 56, the system 10 shown in FIGS. 3A and 3B is identical to the system 10 seen in FIGS. 1A and 1B. Accordingly, common elements and features are designated with like reference numerals and a discussion of those common elements and feature is omitted in connection with FIGS. 1A and 1B, the prior discussion being herein incorporated by reference.

Instead of using a stretch rod 56, the system 10 of FIGS. 3A and 3B utilizes the stream 62 to effectuate axial stretching of the preform 24. The stream 62 is therefore injected with a force that enables the stream 62 to operate as a liquid vector 78, to cause axial stretching of the preform 24, and thereafter to cause radial expansion of the preform 24 into conformity with the surfaces 18 of the cavity 20 defining the shape of the container 64. In all other respects, the embodiment of FIGS. 3A and 3B are the same as FIGS. 1A and 1B.

Figure 4A:
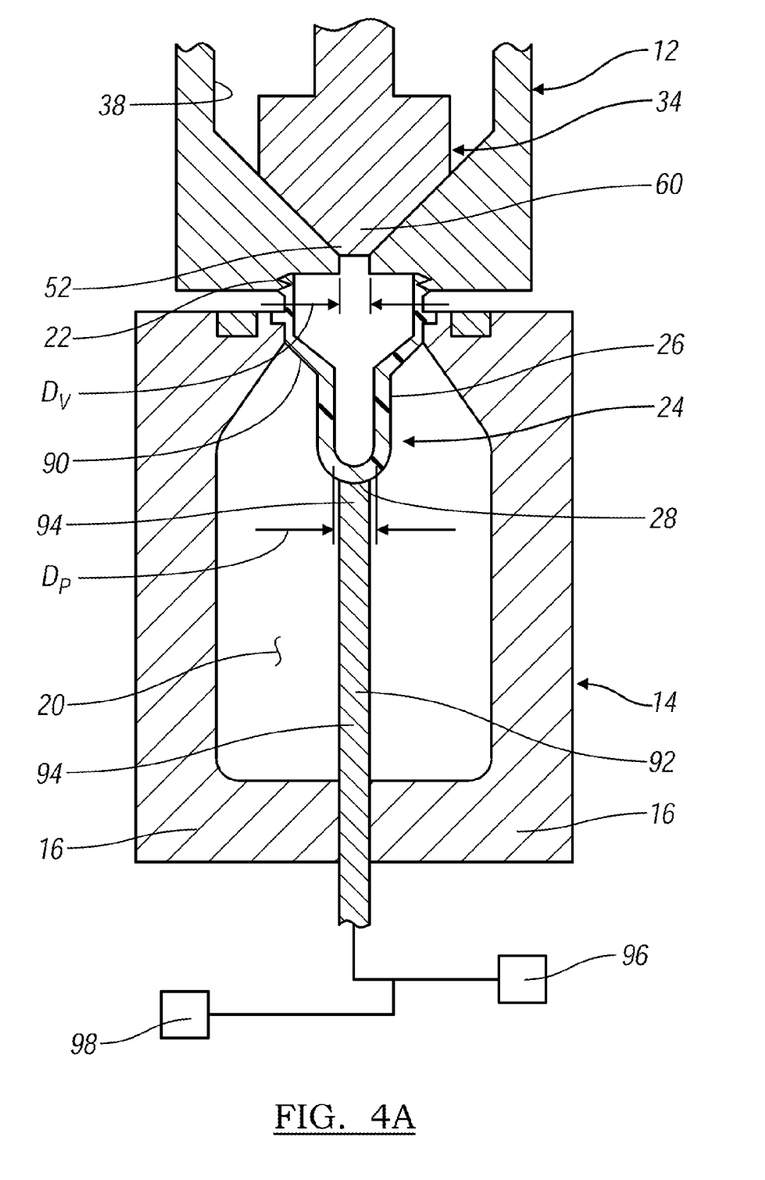
FIGS. 4A and 4B are schematic illustrations of the embodiment seen in FIGS. 3A and 3B and further incorporating the use of a centering rod.
Figure 4B:
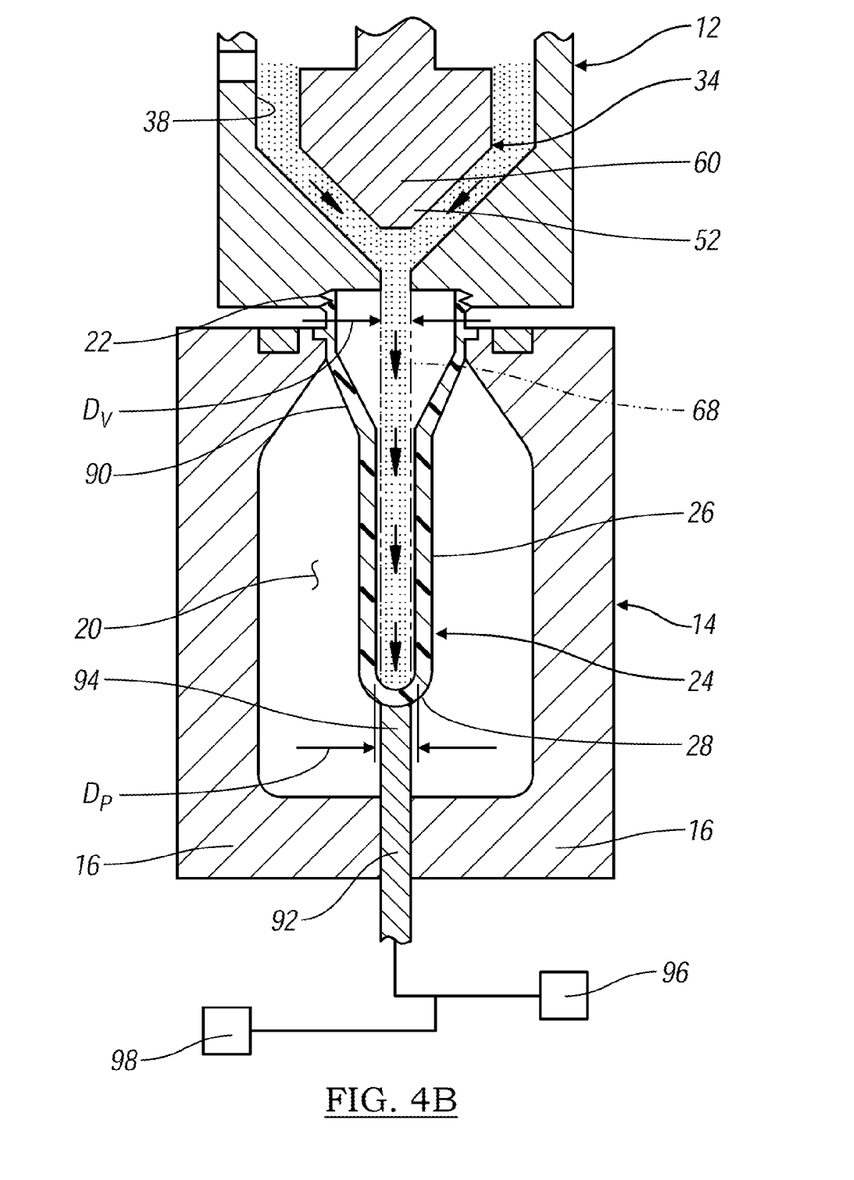

Similarly, the embodiment of FIGS. 4A and 4B is the same as the embodiment seen in FIGS. 3A and 3B, except that a centering rod 68 is used in conjunction with the liquid vector 78. In this latter sense, FIGS. 4A and 4B are also similar to FIGS. 2A and 2B. As with FIGS. 2A and 2B, the extended centering rod 68 engages the closed-end 28 of the preform 24 prior to initial stretching of the preform 24. After the liquid vector 78 is initiated, the centering rod 68 is retracted generally at the rate at which the preform 24 is stretched. The retraction of the centering rod 68 may be directly in response to the stretching of the preform 24, i.e. the centering rod 68 may be acted upon and forced to retract by the stretching preform 24. Alternatively, the retraction of the centering rod 68 may be controlled by the actuator 72 used to initial extend the centering rod 68 into engagement with the preform 24. The retraction the centering rod 68 may also employ a feedback loop that utilizes sensors 74 measuring the pressure being exerted on the contact tip 70 or centering rod 68 by the stream 62. Through the use of the feedback loop, the rate of stretching of the preform 24 may be held or controlled at a desired and consistent, or variable, rate.

To ensure that the above mentioned stream 62 and liquid vector 78, in each of the embodiments, is formed in a tightly formed and directed stream, the outlet 42 has a terminal portion that defines a spray angle 76. As seen in all the figures, the outlet 42 is provided with a constant inner diameter over its length. The diameter defined by the spray angle 76 is the same as or only slightly larger than the diameter of the outlet 42. Preferably, the spray angle is less than 5°. More preferably, the diameter of the spray angle 76 the same as the seal pin bore 56 and therefore equal to 0° or about 0°.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

I claim:
1. A method of forming a container from a preform made of plastic, the method comprising the steps of:

positioning a preform within a mold having interior surfaces defining a cavity in the shape of the container, the preform having a body bounded by a closed end and an open end, the body defining a preform minimum diameter;

injecting a molding medium into the preform, the molding medium being a liquid;

axially stretching the preform within the mold;

radially expanding the preform into conformity with the interior surfaces of the cavity defining the shape of the container, radial expansion being effectuated by the injected molding medium;

the injecting step further including the steps of forming the molding medium into a stream having an outer diameter that is less than the minimum diameter of the preform, and directing the stream downward into the preform to initially only impinge upon the preform at the closed end and to initially avoid impingement upon the preform in areas of the preform other than the closed end.

2. The method of claim 1, wherein the preform includes a transition extending between a finish and a body of the preform, the transition reducing in diameter from the finish to the body of the preform, the step of injecting the molding medium further including the step of forming the stream and injecting the stream such that the stream does not impinge upon the transition.

3. The method of claim 2, wherein the step of injecting the molding medium further including the step of forming the stream and injecting the stream such that the stream does not impinge upon the body of the preform.

4. A method of forming a container from a preform made of plastic, the method comprising the steps of:

positioning a preform within a mold having interior surfaces defining a cavity in the shape of the container, the preform having a body bounded by a closed end and an open end, the body defining a preform minimum diameter;

injecting a molding medium into the preform axially stretching the preform within the mold;

radially expanding the preform into conformity with the interior surfaces of the cavity defining the shape of the container, radial expansion being effectuated by the injected molding medium;

the injecting step further including the steps of forming the molding medium into a stream having an outer diameter that is less than the minimum diameter of the preform, and directing the stream into the preform to initially impinge upon the preform at the closed end and to initially avoid impingement upon the preform in areas of the preform other than the closed end; and wherein the step of axially stretching the preform includes moving a stretch rod to an extended position where the stretch rod is extended within and contacts the preform.

5. The method of claim 4, wherein the step of injecting liquid occurs while the stretch rod is extended within the preform.

6. A method of forming a container from a preform made of plastic, the method comprising the steps of;

positioning a preform within a mold having interior surfaces defining a cavity in the shape of the container, the preform having a body bounded by a closed end and an open end, the body defining a preform minimum diameter;

injecting a molding medium into the preform axially stretching the preform within the mold;

radially expanding the preform into conformity with the interior surfaces of the cavity defining the shape of the container, radial expansion being effectuated by the injected molding medium;

the injecting step further including the steps of forming the molding medium into a stream having an outer diameter that is less than the minimum diameter of the preform, and directing the stream into the preform to initially impinge upon the preform at the closed end and to initially avoid impingement upon the preform in areas of the preform other than the closed end; and wherein the step of injecting liquid occurs after the step of axially stretching the preform.

7. The method of claim 1, wherein the step of axially stretching the preform includes axially stretching the preform as a result of a force exerted on the preform by the molding medium being injected into the preform.

8. The method of claim 1, wherein the step of injecting the molding medium includes the step of forming the stream with a diameter of at least 2 mm less than the minimum diameter of the body of the preform.

9. The method of claim 1, further comprising the steps of extending a centering rod into the cavity, engaging an exterior surface of the closed end of the preform with the centering rod, and retracting the centering rod during axial stretching of the preform.

10. A molding system for hydraulic blow molding a preform made of plastic into a container, the molding system comprising:

a mold having interior surfaces defining a mold cavity in the shape of the container, the mold being configured to receive a preform therein, the preform having a body extending between a closed end and an open end, the body defining a minimum inner diameter of the preform;

a nozzle having a main bore extending therethrough, the nozzle body including an inlet into the main bore and an outlet from the main bore, the outlet defining an outlet diameter;

a seal pin moveable with respect to the nozzle between a closed position and the open position, in the closed position the seal pin closing off the outlet from the main bore and in the open position the seal pin not closing off the outlet;

a source of molding medium, wherein the molding medium is a liquid that is to be retained in the container, the source being the coupled to the nozzle; and the outlet diameter being less than the minimum internal diameter of the preform whereby during molding the molding medium is injected as a stream into the preform from the outlet such that the stream does not impinge the body of the preform.

11. The system of claim 10, wherein the body of the preform includes a transition extending from the open end toward the closed end, the transition reducing in diameter as it progress from the finish toward the closed end.

12. The system of claim 11, wherein the outlet diameter is at least 2 mm less than the minimum inner diameter of the preform.

13. The system of claim 10, further comprising a stretch rod, the stretch rod being located in a central bore of the seal pin and being moveable between a retracted position and an extended position, in the extended position the stretch rod extending into the preform.

14. The system of claim 13, wherein the stretch rod extends centrally through the outlet.

15. The system of claim 13, further comprising a centering rod, the centering rod being moveable between a retracted position and an extended position, in the extended position the centering rod contacting the closed end of the preform on an exterior surface thereof.

16. The system of claim 10, further comprising a centering rod, the centering rod being moveable between a retracted position and an extended position, in the extended position the centering rod contacting the closed end of the preform on an exterior surface thereof and during axial stretching of the preform.

17. The system of claim 10, the outlet includes a terminal portion defining a spray angle.

18. The system of claim 17, wherein the spray angle is defined relative to a central longitudinal axis extending through the outlet and is in the range of 0° to 5°.

19. The system of claim 17, wherein the spray angle is defined relative to a central longitudinal axis extending through the outlet and is about 0°.

20. The system of claim 10, wherein the minimum inner diameter of the preform is defined by a transition of the preform.

\* \* \* \* \*